United States Patent
Sharp et al.

(10) Patent No.: US 9,625,745 B2
(45) Date of Patent: Apr. 18, 2017

(54) HIGH DYNAMIC RANGE, HIGH CONTRAST PROJECTION SYSTEMS

(71) Applicant: RealD Inc., Beverly Hills, CA (US)

(72) Inventors: Gary D. Sharp, Boulder, CO (US); Miller H. Schuck, Erie, CO (US); Douglas J. McKnight, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 121 days.

(21) Appl. No.: 14/541,818

(22) Filed: Nov. 14, 2014

(65) Prior Publication Data
US 2015/0138508 A1   May 21, 2015

Related U.S. Application Data (60) Provisional application No. 61/904,940, filed on Nov. 15, 2013.

(51) Int. Cl.
*G03B 21/28* (2006.01)
*H04N 9/31* (2006.01)
(Continued)

(52) U.S. Cl.
CPC ........... *G02F 1/0136* (2013.01); *G03B 21/14* (2013.01); *H04N 9/3167* (2013.01);
(Continued)

(58) Field of Classification Search
CPC ...... G03B 21/28; G03B 21/14; G03B 21/005; G03B 21/006; G03B 21/008; H04N 9/3126; H04N 9/3141; H04N 9/3102
(Continued)

(56) References Cited

U.S. PATENT DOCUMENTS 2,403,731 A    7/1946  MacNeille
3,704,997 A   12/1972  Smith
(Continued)

FOREIGN PATENT DOCUMENTS

BR    2020130172753    4/2013
CN       101688940      3/2010
(Continued)

OTHER PUBLICATIONS

International Search Report and Written Opinion for PCT/US 07/79958, mailed Jul. 28, 2008.
(Continued)

*Primary Examiner* — William C Dowling
*Assistant Examiner* — Ryan Howard
(74) *Attorney, Agent, or Firm* — Penny L. Lowry; Neil G. Mothew (57) ABSTRACT

Display devices with high dynamic ranges approaching the limitations of the human eye are discussed herein. High dynamic range projections systems may be 2D or 3D and devices may or may not be implemented with polarization preserving optics for high efficiency. In one embodiment, 2D HDR projection systems may compensate the modulator for varying transmission and contrast versus field of view. In another embodiment, 3D HDR projection systems may include a global or pixelated/segmented modulator. The global or pixelated/segmented modulator may be included in a stereoscopic polarization switch or in a polarization-preserving stereoscopic projection system. Additionally, a combination of global/global or pixelated/pixelated, or global/pixelated modulators may be used.

19 Claims, 9 Drawing Sheets

(51) Int. Cl.
  *G02F 1/01* (2006.01)
  *G03B 21/14* (2006.01)
  *G03B 21/20* (2006.01)
(52) U.S. Cl.
  CPC .......... *G03B 21/2073* (2013.01); *G03B 21/28* (2013.01); *H04N 9/3141* (2013.01)
(58) Field of Classification Search
  USPC .............................. 348/758; 357/7, 8, 98, 99
  See application file for complete search history.

(56) References Cited

U.S. PATENT DOCUMENTS

| | | | |
|---|---|---|---|
| 4,515,441 A | 5/1985 | Wentz et al. | |
| 4,792,850 A | 12/1988 | Liptoh | |
| 5,164,854 A | 11/1992 | Takanashi | |
| 5,225,861 A | 7/1993 | Marks | |
| 5,278,680 A | 1/1994 | Karasawa | |
| 5,420,604 A | 5/1995 | Scheffer et al. | |
| 5,435,859 A | 7/1995 | Torii | |
| 5,453,859 A | 9/1995 | Sannohe et al. | |
| 5,481,321 A | 1/1996 | Lipton | |
| 5,497,270 A | 3/1996 | Rud | |
| 5,566,367 A | 10/1996 | Mitsutake | |
| 5,822,129 A | 10/1998 | Sekine | |
| 5,917,562 A | 6/1999 | Woodgate et al. | |
| 5,917,568 A | 6/1999 | Johnson | |
| 5,993,004 A | 11/1999 | Moseley | |
| 6,147,802 A | 11/2000 | Itoh et al. | |
| 6,190,013 B1 | 2/2001 | Tani et al. | |
| 6,206,532 B1 | 3/2001 | Hawes | |
| 6,252,624 B1 | 6/2001 | Yuasa | |
| 6,280,034 B1 | 8/2001 | Brennesholtz | |
| 6,288,840 B1 | 9/2001 | Perkins | |
| 6,375,327 B2 | 4/2002 | Holman | |
| 6,437,915 B2 | 8/2002 | Moseley et al. | |
| 6,454,416 B2 | 9/2002 | Aoto | |
| 6,508,557 B1 | 1/2003 | Brennesholtz | |
| 6,547,396 B1 | 4/2003 | Svardal | |
| 6,582,080 B2 | 6/2003 | Gibbon et al. | |
| 6,704,065 B1 | 3/2004 | Sharp et al. | |
| 6,761,459 B1 | 7/2004 | Arsenich | |
| 6,801,263 B2 | 10/2004 | Sato et al. | |
| 6,976,759 B2 | 12/2005 | Magarill | |
| 7,008,070 B2 | 3/2006 | Nishida | |
| 7,131,737 B2 | 11/2006 | Silverstein et al. | |
| 7,193,765 B2 | 3/2007 | Christensen | |
| 7,204,592 B2 | 4/2007 | O'Donnell | |
| 7,220,006 B2 | 5/2007 | Allen et al. | |
| 7,224,411 B2 | 5/2007 | Gibbon et al. | |
| 7,261,453 B2 | 8/2007 | Morejon | |
| 7,270,416 B2 | 9/2007 | Yamanaka | |
| 7,295,371 B1 | 11/2007 | Sedlmayr | |
| 7,364,303 B2 | 4/2008 | Inoko | |
| 7,387,388 B2 | 6/2008 | Newell | |
| 7,551,341 B1 | 6/2009 | Ward et al. | |
| 7,559,653 B2 | 7/2009 | Silverstein et al. | |
| 7,635,187 B2 | 12/2009 | Sonehara | |
| 7,753,531 B2 | 7/2010 | Fujita | |
| 7,857,455 B2 | 12/2010 | Cowan et al. | |
| 7,887,193 B2 | 2/2011 | Kanayama | |
| 8,632,185 B2 | 1/2014 | Ianchulev | |
| 8,727,536 B2 | 5/2014 | Schuck | |
| 8,833,943 B2 | 9/2014 | Schuck | |
| 2001/0013971 A1 | 8/2001 | Kleinberger | |
| 2003/0128320 A1 | 7/2003 | Mi et al. | |
| 2004/0090601 A1 | 5/2004 | Nakanishi | |
| 2004/0246586 A1 | 12/2004 | Cho | |
| 2004/0263806 A1 | 12/2004 | Silverstein | |
| 2005/0017938 A1 | 1/2005 | O'Donnell | |
| 2005/0157233 A1 | 7/2005 | Wu et al. | |
| 2005/0185139 A1 | 8/2005 | Yamanaka | |
| 2005/0270618 A1 | 12/2005 | Uchiyama | |
| 2006/0007537 A1 | 1/2006 | Sedlmayr | |
| 2006/0044516 A1 | 3/2006 | Inoko | |
| 2006/0092380 A1 | 5/2006 | Salsman | |
| 2006/0215118 A1 | 9/2006 | Sonehara | |
| 2006/0221429 A1 | 10/2006 | Christensen | |
| 2006/0291053 A1 | 12/2006 | Robinson et al. | |
| 2007/0279595 A1 | 12/2007 | Magarill | |
| 2008/0143964 A1 | 6/2008 | Cowan | |
| 2008/0143965 A1 | 6/2008 | Cowan | |
| 2008/0225236 A1 | 9/2008 | Schuck et al. | |
| 2009/0128780 A1* | 5/2009 | Schuck | G02B 26/008 353/20 |
| 2010/0328561 A1 | 12/2010 | Schuck | |
| 2011/0096295 A1 | 4/2011 | Cowan | |
| 2011/0205496 A1 | 8/2011 | Schuck | |
| 2012/0242867 A1 | 9/2012 | Shuster | |
| 2013/0088688 A1 | 4/2013 | Read et al. | |
| 2013/0169935 A1 | 7/2013 | Schuck | |
| 2013/0182227 A1 | 7/2013 | Schuck | |
| 2015/0002819 A1 | 1/2015 | Schuck | |
| 2016/0041460 A1 | 2/2016 | Schuck | |

FOREIGN PATENT DOCUMENTS

| | | |
|---|---|---|
| CN | 103383494 | 11/2013 |
| CN | 103827745 | 5/2014 |
| DE | 20023883 U1 | 3/2007 |
| EP | 349692 A2 | 10/1990 |
| EP | 1961237 | 6/2007 |
| EP | 2074479 | 4/2008 |
| EP | 2145215 | 11/2008 |
| EP | 2067066 | 6/2009 |
| EP | 2469336 | 6/2012 |
| EP | 2732335 | 5/2014 |
| JP | S62-011823 B1 | 1/1987 |
| JP | H04-63305 A | 2/1992 |
| JP | H05-073116 | 3/1993 |
| JP | H05-127120 A | 5/1993 |
| JP | H06-289387 | 10/1994 |
| JP | H07-056167 | 3/1995 |
| JP | H07-064075 | 3/1995 |
| JP | 07-333557 | 12/1995 |
| JP | 2538127 B2 | 9/1996 |
| JP | H08-317428 | 11/1996 |
| JP | H09-026555 | 1/1997 |
| JP | 2002-287092 | 10/2002 |
| JP | 2002-287092 A | 10/2002 |
| JP | 2004-205919 A | 7/2004 |
| JP | 2005-512118 A | 4/2005 |
| JP | 2005-241870 | 9/2005 |
| JP | 2005-241870 A | 9/2005 |
| JP | 2006-133601 A | 5/2006 |
| JP | 2006-227361 A | 8/2006 |
| JP | 2009-265120 A | 11/2009 |
| JP | 2010-506199 | 2/2010 |
| JP | 2010-507130 | 3/2010 |
| JP | 2010-528323 | 8/2010 |
| JP | 5635773 B2 | 12/2014 |
| JP | 5641424 B2 | 12/2014 |
| KR | 2009008932 | 8/2009 |
| KR | 20090094224 | 9/2009 |
| KR | 20100023858 A | 3/2010 |
| KR | 20140054072 A | 5/2014 |
| KR | 20140102775 | 8/2014 |
| WO | 00-78056 | 12/2000 |
| WO | 2005-069058 | 7/2005 |
| WO | 2005-069058 A1 | 7/2005 |
| WO | 2006-038744 A1 | 4/2006 |
| WO | 2007-070245 | 6/2007 |
| WO | 2008-042798 A1 | 4/2008 |
| WO | 2013-010167 A2 | 1/2013 |

OTHER PUBLICATIONS

International Preliminary Report on Patentability for PCT/US 07/79958, mailed Apr. 9, 2009.
Examination Report and Supplemental European Search Report for European application 07852705.8, dated Sep. 4, 2009.
International preliminary report on patentability in corresponding PCT application No. PCT/US08/63340 dated Nov. 10, 2009.

(56) References Cited

OTHER PUBLICATIONS

Supplemental European Search Report and Examination Report in European application No. 07843526.0 mailed Oct. 4, 2011.
Examination Report for European application 07843526.0, dated Jul. 17, 2012.
Notice of Reasons for Rejection in Japanese application No. 2009-530647, dated Dec. 4, 2013.
Petition for Inter Partes Review of U.S. Pat. No. 7,857,455 entered Oct. 7, 2014. *Master Image 3D, Inc. and Master Image 3D Asia, LLC, v. Reald Inc.* Case No. IPR2015-00035, U.S. Pat. No. 7,857,455 filed Oct. 7, 2014.
Exhibit 1003 "Declaration of Matthew S. Brennescholtz" entered Oct. 7, 2014. *Master Image 3D, Inc. and Master Image 3D Asia, LLC, v. Reald Inc.* Case No. IPR2015-00035, U.S. Pat. No. 7,857,455 filed Oct. 7, 2014.
Preliminary Response to Petition for Inter Partes Review of U.S. Pat. No. 7,857,455 entered Feb. 2, 2015. *Master Image 3D, Inc. and Master Image 3D Asia, LLC, v. Reald Inc.* Case No. IPR2015-00035, U.S. Pat. No. 7,857,455 filed Oct. 7, 2014.
Decision—Institution of Inter Partes Review of U.S. Pat. No. 7,857,455, entered Apr. 23, 2015. *Master Image 3D, Inc. and Master Image 3D Asia, LLC, v. Reald Inc.* Case No. IPR2015-00035, U.S. Pat. No. 7,857,455 filed Oct. 7, 2014.
Patent Owner's Response Regarding Inter Partes Review of U.S. Pat. No. 7,857,455, entered Jul. 14, 2015. *Master Image 3D, Inc. And Master Image 3D Asia, LLC, v. Reald Inc.* Case No. IPR2015-00035, U.S. Pat. No. 7,857,455 filed Oct. 7, 2014.
Exhibit 2005, "Declaration of Ying-Moh Liu," Patent Owner's Response Regarding Inter Partes Review, entered Jul. 14, 2015. *Master Image 3D, Inc. and Master Image 3D Asia, LLC, v. Reald Inc.* Case No. IPR2015-00035, U.S. Pat. No. 7,857,455, filed Oct. 7, 2014.
Exhibit 2006, "Declaration of Matt Cowan," Patent Owner's Response Regarding Inter Partes Review of U.S. Pat. No. 7,857,455, entered Jul. 14, 2015. *Master Image 3D, Inc. and Master Image 3D Asia, LLC, v. Reald Inc.* Case No. IPR2015-00035, U.S. Pat. No. 7,857,455 filed Oct. 7, 2014.
Exhibit 2008, "Declaration of Robert R. McLeod," Patent Owner's Response Regarding Inter Partes Review of U.S. Pat. No. 7,857,455, entered Jul. 14, 2015. *Master Image 3D, Inc. and Master Image 3D Asia, LLC, v. Reald Inc.* Case No. IPR2015-00035, U.S. Pat. No. 7,857,455 filed Oct. 7, 2014.
Petitioner Response to Motion for Observation on Cross Examination of Matthew Brennescholtz, entered Nov. 25, 2015. *Master Image 3D, Inc. and Master Image 3D Asia, LLC, v. Reald Inc.* Case No. IPR2015-00035, U.S. Pat. No. 7,857,455 filed Oct. 7, 2014.
Exhibit 2190, "Public Transcript of M. Brennescholtz" entered Nov. 11, 2015. *Master Image 3D, Inc. and Master Image 3D Asia, LLC, v. Reald Inc.* Case No. IPR2015-00035, U.S. Pat. No. 7,857,455 filed Oct. 7, 2014.
Petition for Inter Partes Review of U.S. Pat. No. 7,959,296 entered Oct. 7, 2014. *Master Image 3D, Inc. and Master Image 3D Asia, LLC, v. Reald Inc.,* Case No. IPR2015-00036, U.S. Pat. No. 7,959,296 filed Oct. 7, 2014.
Preliminary Response to Petition for Inter Partes Review of U.S. Pat. No. 7,959,296 entered Jan. 29, 2015. *Master Mage 3D, Inc. and Master Image 3D Asia, LLC, v. Reald Inc.,* Case No. IPR2015-00036, U.S. Pat. No. 7,959,296 filed Oct. 7, 2014.
Decision—Denying Institution of Inter Partes Review, entered Apr. 22, 2015. *Master Image 3D, Inc. and Master Mage 3D Asia, LLC, v. Reald Inc.,* Case No. IPR2015-00036, U.S. Pat. No. 7,959,296 filed Oct. 7, 2014.

PTAB Final Written Decision, entered Apr. 14, 2016. *MasterImage 3D, Inc and Masterimage 3D Asia, LLC v. Reald Inc.* Case No. IPR2015-00040, U.S. Pat. No. 8,220,934 filed Oct. 7, 2014.
Foster; "A Polarizing Vertical Illuminator"; Journal Optical Soc. New York, vol. 28, (1938), pp. 124-127.
Jones, R. Clark. "Ultimate Performance of Polarizers for Visible Light," JOSA vol. 52 No. 7, Jul. 1962.
King et al.; "Varifocal Mirror Technique for Video Transmission of Three-Dimensional Images"; Applied Optics, vol. 9, No. 9, (1970).
Kingslake, R.; "Optical System Design"; Academic Press; (1983).
Muirhead; "Variable Focal Length Mirrors"; Phys. and Meteorology Section, Suffield Experimental Station, Ralston, Alberta, Canada; Rev_Sci. Instrum_vol. 32, No. 210 (1961).
Pan, Jui-Wen, et al., "Homogenized LED-illumination using microlens arrays for a pocket-sized projector," Optics Express, Aug. 20, 2007, vol. 15, No. 17.
Murdoch et al., "Veiling glare and perceived black in high dynamic range displays," J. Opt. Soc. Am. A, 29:4, Apr. 2012.
Pastoor et al., "3-D Displays: A Review of Current Technologies", Display Devices, Dempa Publications, Tokyo, JP, vol. 17, No. 2, pp. 100-110 (1997).
Pate; "Polarization Conversion Systems for Digital Projectors", Published Apr. 21, 2006.
Pavlovych et al., "A High-Dynamic Range Projection System," Photonic Applic. in Biosensing and Imaging, SPIE vol. 5969, Sep. 2005.
Robinson et al., "Polarization Engineering for LCD Projection", John Wiley & Sons, (2005).
Seetzen et al., "High dynamic range display systems," ACM Transactions on Graphics, 23(3); 2004.
Seetzen et al., "A high dynamic range display using low and high resolution modulators," SID International Symposium Digest, paper 54.2; (date).
Shao et al., "MEMS Three-Dimensional Scan Mirror", Dept. of Elec. and Computer Engr., Montana State Univ.—Bozeman, (2004).
Shurcliff, "Polarized Light"; Harvard University Press, (1962).
Stupp et al, "Projection Displays", John Wiley & Sons Ltd., (1999), pp. 143-145.
Yang et al., "Fundamentals of Liquid Crystal Devices"; John Wiley & Sons Ltd., (2006).
Yip et al., "Efficient polarization converter for projection displays", Applied Optics, vol. 36, No. 25, (1997).
Yoder, "Opto-mechanical Systems Design", Optical Engineering, vol. 9, Marcel Dekker Inc. (1986).
International Search Report and Written Opinion for PCT/US 14/65725 mailed on Feb. 6, 2015.
Patent Owner's Response Regarding Inter Partes Review of U.S. Pat. No. 7,857,455, entered Jul. 14, 2015. *Master Mage 3D, Inc. and Master Image 3D Asia, LLC, v. Reald Inc.* Case No. IPR2015-00035, U.S. Pat. No. 7,857,455 filed Oct. 7, 2014.
Exhibit 2005, "Declaration of Ying-Moh Liu," Patent Owner's Response Regarding Inter Partes Review, entered Jul. 14, 2015. *Master Image 3D, Inc. and Master Image 3D Asia, LLC, v. Reald Inc.* Case No. IPR2015-00035, U.S. Pat. No. 7,857,455 filed Oct. 7, 2014.
Exhibit 2006, "Declaration of Matt Cowan," Patent Owner's Response Regarding Inter Partes Review of U.S. Pat. 7,857,455, entered Jul. 14, 2015. *Master Image 3D, Inc. and Master Image 3D Asia, LLC, v. Reald Inc.* Case No. IPR2015-00035, U.S. Pat. No. 7,857,455 filed Oct. 7, 2014.

\* cited by examiner

FIG. 10

HIGH DYNAMIC RANGE, HIGH CONTRAST PROJECTION SYSTEMS

CROSS-REFERENCE TO RELATED APPLICATIONS

This application is related to and claims priority to U.S. patent application Ser. No. 61/904,940, entitled "High dynamic range, high contrast projection systems" filed Nov. 15, 2013, which is herein incorporated by reference in its entirety.

TECHNICAL FIELD

This disclosure generally relates to high dynamic range optical systems, and more particularly to high dynamic range projection systems.

BACKGROUND

Dynamic range describes the ratio of maximum-to-minimum luminance detected by a sensor, for example the eye, or presented by a display, for example a projector. The long-term dynamic range of the human eye spans many orders of magnitude, and exceeds the dynamic range of typical projection systems. The instantaneous dynamic range of the human eye is limited by intra-ocular reflections and scattering ("*Veiling glare and perceived black in high dynamic range displays,*" M. Murdoch and I Heynderickx, J. Opt. Soc. Am. A, Vol. 29, No. 4, April 2012); yet this often exceeds the instantaneous dynamic range of a projector. For higher perceived image quality, it is desirable to implement display devices with dynamic ranges approaching the limits of the human eye.

BRIEF SUMMARY

According to an aspect of the present disclosure, a polarization conversion system (PCS) may include a polarization beam splitter (PBS) operable to receive randomly polarized light from a projection system, and operable to direct light with a first polarization state along a first light path and operable to direct light with a second polarization state along a second light path. The PCS may also include a first optical stack and a second optical stack. The first optical stack may be located on the first light path and operable to modulate the received light with the first polarization state. The second optical stack may be located on the second light path and operable to modulate the received light with the second polarization state.

According to another aspect of the present disclosure, a polarization conversion system may include a light splitting element which may be operable to receive randomly polarized image light from a projector lens, and which may also be operable to direct light with a first polarization state along a first light path and operable to direct light with a second polarization state along a second light path. The polarization conversion system may also include a reflecting element located on the second light path which may be operable to receive reflected light from the light splitting element and a polarization rotator element located on the second light path which may be operable to receive reflected light from the reflecting element. The polarization conversion system may additionally include a modulator located on the first light path and the second light path, both of which may be operable to selectively change the transmission of the first and second light path, and the modulator may be further operable to receive light from a high resolution spatial light modulator. The high resolution spatial light modulator may change the transmission or reflection of light. One example of a high resolution spatial light modulator is a 4K digital light processing projector (DLP). The modulator in the polarization conversion system may be a pixelated modulator which may include a modulator pixel size that is roughly equivalent to the size of projection lens pupil. The modulator may also be a global modulator. Additionally, the modulator may be achromatic.

According to another aspect of the present disclosure, a polarization conversion system (PCS) may include a first projection lens, a second projection lens, a polarization beam splitter which may be operable to receive image source light and which may transmit light of a first polarization state toward the first projection lens on a first light path and operable to reflect light of a second polarization state toward a second light path. The PCS may include a reflecting element located on the second light path and which may be operable to reflect light toward the second projection lens. The PCS may further include at least a first high dynamic range modulator located on the first light path which may be operable to rotate the polarization of light passing therethrough to provide images of first and second polarization states, in which the first high dynamic range modulator may be located between the first projection lens and the projection screen. Additionally, the first and second projection lenses may be operable to direct the polarization encoded images toward the projection screen.

Continuing the discussion, the PCS may include a relay lens system which may be located before the polarization beam splitter. The first high dynamic range modulator may be located within the relay lens system, and may also be a global modulator. The PCS may also include a second high dynamic range modulator located on the second light path which may be operable to rotate the polarization of light passing therethrough to provide images of first and second polarization states. The second high dynamic range polarization modulator may be located between the second projection lens and the projection screen. The first and second high dynamic range modulators may be located within the first and second projection lenses, respectively and these high dynamic range modulators may both be global modulators. Additionally, the first and the second high dynamic range modulators may be located near or at an intermediate image plane. The first and the second high dynamic range modulators may also be achromatic. Continuing the discussion of this system, the first high dynamic range modulator may be a pixelated modulator and the second high dynamic range modulator may be a pixelated or global modulator. Additionally, the first and the second high dynamic range modulators may both be global. Furthermore, the first and second pixelated modulators may include modulator pixel sizes that are roughly equivalent to the size of projection lens pupil.

According to another aspect of the present disclosure, a polarization conversion system ("PCS") for transmitting polarization encoded imagery to a projection screen may include a first projection lens, a second projection lens, a polarization beam splitter which may be operable to receive image source light and to transmit light of a first polarization state toward the first projection lens on a first light path, and operable to reflect light of a second polarization state toward a second light path. The PCS may also include a reflecting element which may be located on the second light path operable to reflect light toward the second projection lens and a high dynamic range modulator located on the first and second light paths, and operable to rotate the polarization of light passing therethrough to provide images of first and second polarization states. The high dynamic polarization modulator may be located between a projection lens and the projection screen and may be further operable to receive light from a high resolution spatial light modulator, in which the high resolution spatial light modulator may change the transmission or reflection of light. Additionally, the first and second projection lenses may be operable to direct the polarization encoded images toward the projection screen.

BRIEF DESCRIPTION OF THE DRAWINGS

Embodiments are illustrated by way of example in the accompanying figures, in which like reference numbers indicate similar parts, and in which.

DETAILED DESCRIPTION

According to an aspect of the present disclosure, a polarization conversion system (PCS) may include a polarization beam splitter (PBS) operable to receive randomly polarized light from a projection system, and operable to direct light with a first polarization state along a first light path and operable to direct light with a second polarization state along a second light path. The PCS may also include a first optical stack and a second optical stack. The first optical stack may be located on the first light path and operable to modulate the received light with the first polarization state. The second optical stack may be located on the second light path and operable to modulate the received light with the second polarization state.

According to another aspect of the present disclosure, a polarization conversion system may include a light splitting element which may be operable to receive randomly polarized image light from a projector lens, and which may also be operable to direct light with a first polarization state along a first light path and operable to direct light with a second polarization state along a second light path. The polarization conversion system may also include a reflecting element located on the second light path which may be operable to receive reflected light from the light splitting element and a polarization rotator element located on the second light path which may be operable to receive reflected light from the reflecting element. The polarization conversion system may additionally include a modulator located on the first light path and the second light path, both of which may be operable to selectively change the transmission of the first and second light path, and the modulator may be further operable to receive light from a high resolution spatial light modulator. The high resolution spatial light modulator may change the transmission or reflection of light. One example of a high resolution spatial light modulator is a 4K digital light processing projector (DLP). The modulator in the polarization conversion system may be a pixelated modulator which may include a modulator pixel size that is roughly equivalent to the size of projection lens pupil. The modulator may also be a global modulator. Additionally, the modulator may be achromatic.

According to another aspect of the present disclosure, a polarization conversion system (PCS) may include a first projection lens, a second projection lens, a polarization beam splitter which may be operable to receive image source light and which may transmit light of a first polarization state toward the first projection lens on a first light path and operable to reflect light of a second polarization state toward a second light path. The PCS may include a reflecting element located on the second light path and which may be operable to reflect light toward the second projection lens. The PCS may further include at least a first high dynamic range modulator located on the first light path which may be operable to rotate the polarization of light passing therethrough to provide images of first and second polarization states, in which the first high dynamic range modulator may be located between the first projection lens and the projection screen. Additionally, the first and second projection lenses may be operable to direct the polarization encoded images toward the projection screen.

Continuing the discussion, the PCS may include a relay lens system which may be located before the polarization beam splitter. The first high dynamic range modulator may be located within the relay lens system, and may also be a global modulator. The PCS may also include a second high dynamic range modulator located on the second light path which may be operable to rotate the polarization of light passing therethrough to provide images of first and second polarization states. The second high dynamic range polarization modulator may be located between the second projection lens and the projection screen. The first and second high dynamic range modulators may be located within the first and second projection lenses, respectively and these high dynamic range modulators may both be global modulators. Additionally, the first and the second high dynamic range modulators may be located near or at an intermediate image plane. The first and the second high dynamic range modulators may also be achromatic. Continuing the discussion of this system, the first high dynamic range modulator may be a pixelated modulator and the second high dynamic range modulator may be a pixelated or global modulator. Additionally, the first and the second high dynamic range modulators may both be global. Furthermore, the first and second pixelated modulators may include modulator pixel sizes that are roughly equivalent to the size of projection lens pupil.

According to another aspect of the present disclosure, a polarization conversion system ("PCS") for transmitting polarization encoded imagery to a projection screen may include a first projection lens, a second projection lens, a polarization beam splitter which may be operable to receive image source light and to transmit light of a first polarization state toward the first projection lens on a first light path, and operable to reflect light of a second polarization state toward a second light path. The PCS may also include a reflecting element which may be located on the second light path operable to reflect light toward the second projection lens and a high dynamic range modulator located on the first and second light paths, and operable to rotate the polarization of light passing therethrough to provide images of first and second polarization states. The high dynamic polarization modulator may be located between a projection lens and the projection screen and may be further operable to receive light from a high resolution spatial light modulator, in which the high resolution spatial light modulator may change the transmission or reflection of light. Additionally, the first and second projection lenses may be operable to direct the polarization encoded images toward the projection screen.

In projection systems, the dynamic range can be described on a longer-term frame-to-frame basis, which may be referred to as inter-frame or sequential contrast, and on an instantaneous single-frame basis, which may be referred to as intra-frame, checkerboard, or ANSI contrast.

The sequential contrast of a projection device is determined by displaying a full-frame white image, measuring its luminance, and comparing it to the luminance of a full-frame black image. Typical sequential contrast ratios for digital cinema projectors are 2000:1. The sequential contrast of projection display is limited by the leakage of light from the illumination optics into the imaging optics when the display panel is in the dark state. For DLP-based projectors, this includes light reflected from the mirror hinges and edges, light scattered from glass materials, surfaces and coatings, and light reflecting or scattering from mechanical features. For LCOS-based systems, this includes light leakage due to imperfect polarization states and similar interactions between light, glass and mechanical features as in the DLP system. Since the leakage from the panel dark state represents the lowest light output of the projector, the projector's sequential contrast is, in most cases, equal to the projector's dynamic range.

Intra-frame contrast, which may be referred to as checkerboard or ANSI contrast, is determined by locating equal sized black and white rectangles within a single frame, and measuring the ratio of luminance in the white squares relative to the black squares. The intra-frame contrast is generally lower than sequential contrast, as multiple reflections and scattering of light from the white rectangles adds to the sequential leakage in the dark rectangle areas. Typical intra-frame contrast ratios for digital cinema projectors can vary from 100:1 to 500:1, depending on the cleanliness and quality of the imaging optics.

For images with high gray-level or high IRE pixels, intra-frame contrast limits the perceived quality of the projected image. Light from the bright pixels tends to pollute the dark areas. For images with low gray-level or low IRE pixels, the sequential leakage limits the perceived image quality. Stated differently, variations in the image black levels are "crushed" or reduced to unnoticeable differences.

Figure 1:
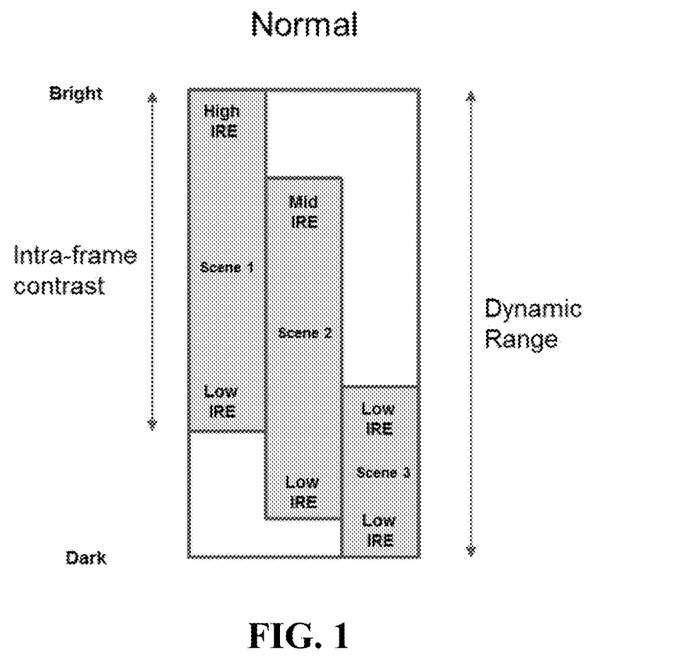
FIG. 1 is a schematic diagram illustrating dynamic range, intra-frame contrast for a typical projector.

FIG. 1 depicts the dynamic range and intra-frame contrast for a typical projector. As illustrated in FIG. 1, intra-frame contrast or within frame contrast may have high IRE pixels and in this example, the intra-frame contrast may lower the quality of the projected frame. Additionally, the dynamic range may have low IRE pixels and in this example, the high dynamic range or frame to frame contrast may lower the quality of the sequentially projected frames.

HDR Displays

In an effort to improve dynamic range and intra-frame contrast, an optical device can be inserted into the projector optical path to more precisely control the illumination reaching the screen. The optical device works in concert with signal conditioning of the input data to improve dynamic range and intra-frame contrast while maintaining the artistic intent of the content. Examples include U.S. Pat. No. 7,220,006 B2 to Allen et al, and "A High-Dynamic Range Projection System," by A. Pavlovych and W. Stuerzlinger, Photonic Applications in Biosensing and Imaging, SPIE vol. 5969, ISBN 081945988-7, September 2005. It is also possible to use a simplified scheme in which the input data are not modified. In this case, the dark regions of the image are simply darkened further to improve the perception of contrast. The resulting reduction in fidelity is, at least partially, tolerated by the visual system.

The optical device may be located at several points in a projection system: 1) at a field position, or at the display or a conjugate image plane of the display, 2) at a pupil position, for example, in the illumination optics or projection lens aperture stop, or 3) at a position between a field and a pupil, for example, outside the exit surface of a projection lens. An optical device placed at a field position operates spatially on the image, either as a global modulation of the entire image or as a pixelated modulation of the image. For pupil position implementation, an optical device typically operates globally on the entire image by reducing the amount of light through the pupil at appropriate times. If the pupil modulator could modulate light based on incidence angle, then a more pixelated modulation would result. Devices located between pupil and field positions may account for both the angular and spatial nature of the unformed image.

A system described in "A High-Dynamic Range Projection System," by A. Pavlovych and W. Stuerzlinger ("A high-dynamic range projection system," by A. Pavlovych and W. Stuerzlinger, www.cs.yorku.ca/~{andriyp, wolfgang}) locates a modulator, in this case, a liquid-crystal display, at a field position. The field position is an intermediate image plane generated by adding a relay lens after a projection lens. The relay forms a real image of a DLP panel at the LCD. An objective follows the LCD to re-project the image to the screen. The LCD absorbs a large portion of the unpolarized light from the projector, and is therefore inefficient (approximately 15% transmissive).

A system described in "High dynamic range display systems," by H. Seetzen et al, ("High dynamic range display systems," by H. Seetzen et al, Siggraph 2004, ACM Transactions on Graphics, 23(3).), utilizes a projector as a backlight for an LCD. The projector provides a high brightness image, with similar resolution to the LCD, but slightly defocused to avoid moire issues, while the LCD provides a second stage of modulation. The dynamic range is reported to be the multiplication of the projector contrast and LCD contrast. In this case, the modulator is the projected real image and is located at a field or the image plane. In order to account for the slightly blurred projector image, the authors convolved the projector pixel blur function with the square root of the linear image, and divided the LCD panel image by this convolution to account for the blur.

Seetzen ("A high dynamic range display using low and high resolution modulators," by H. Seetzen et al, SID International Symposium Digest, paper 54.2) also describes an LED-backlight HDR display in "A high dynamic range display using low and high resolution modulators". In this case, the authors describe a low resolution backlight that includes high brightness LEDs arranged in an array. The LEDs are current and pulse controlled to serve as the modulator. In this case, the modulator is located at a field or image position.

Figure 2:
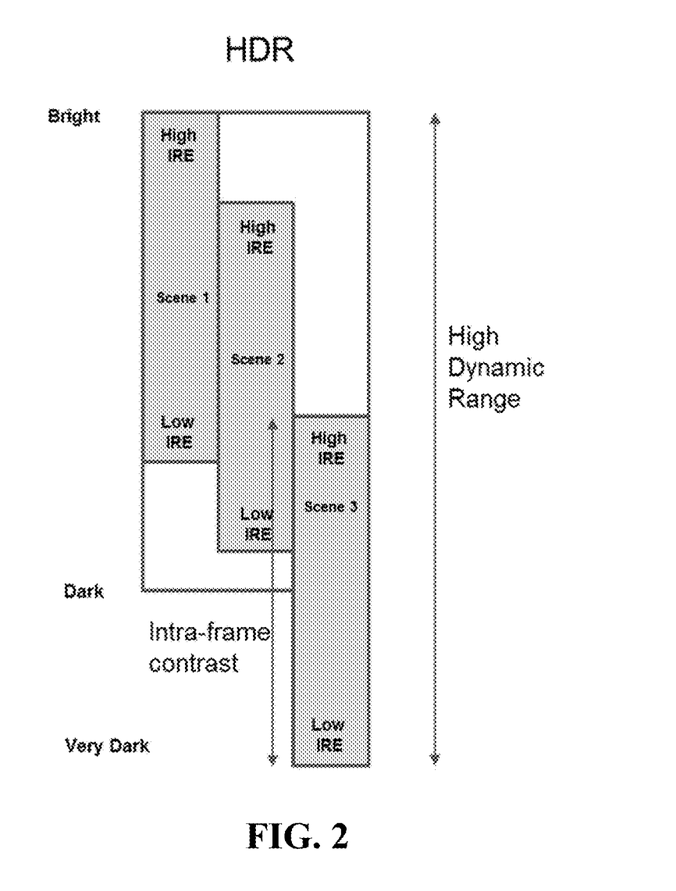
FIG. 2 is a schematic diagram illustrating dynamic range, intra-frame contrast and pixel addressing for a high dynamic range projector.

U.S. Pat. No. 7,220,006 to Allen et al, is a pupil position system, and utilizes an adjustable iris at the projection lens aperture stop to increase the sequential contrast, and therefore long-term dynamic range, of a projector. The iris size is adjusted based on the peak or average pixel IRE level measured in an image frame, while the IRE levels themselves are re-adjusted to account for the lowered lens throughput. This sort of "global" modulation can improve the intra-frame contrast at low light levels, while extending the overall system dynamic range. FIG. 2 depicts the dynamic range, intra-frame contrast, and pixel addressing for such an HDR projector.

HDR projection may pertain to the display of imagery that spans the luminance range appropriate to represent a viewing experience in the natural world. For example, in outdoor scenes, specular reflections from objects illuminated by direct sunlight may be far above that provided by current projection systems. At the other end of the spectrum, objects in shadow may be displayed by employing deep black levels and ark detail that may be frequently lost in displayed imagery due to various sources of stray light. From the display perspective, the matter of enabling HDR thus may relate to two advances in performance; the ability to simultaneously display very high local peak brightness, and the ability to display extremely dark local black levels (with an appropriate increase in bit depth.

Polarization-Preserving Stereo Systems

Polarization-preserving stereoscopic cinema systems have been described in several patents and patent applications, for example, U.S. Pat. No. 7,905,602, U.S. Pat. No. 7,857,455, U.S. Patent Application Publication No. 20090128780, and WO 2013010167A3, all of which are herein incorporated by reference in their entireties. Randomly polarized light from a DLP projector is split into orthogonal polarization states, re-directed and manipulated to produce matching polarization states, and overlaid on-screen for viewing. These systems may actively switch polarization states, for example with liquid-crystal switches, or use passive components in dual projector configurations, for example one projector per eye. Once the randomly polarized light is sorted into orthogonal polarization states, there is an opportunity to locate polarization-based modulators in the optical path(s) to efficiently modulate light.

Several HDR devices for projection are described herein. Devices may or may not be implemented with polarization preserving optics for high efficiency. Most of the devices may be located between a field and a pupil position. One embodiment may be placed very close to a field position.

2D HDR Projection

High dynamic range images can be generated by placing a low resolution light modulator in the same optical path as a high resolution spatial light modulator (e.g. a DLP panel). The combination of the two modulators on an optical path is termed a high dynamic range system. The low resolution modulator may have multiple modulating areas (or pixels), or it may simply be a "single pixel" which uniformly modulates all areas of an image with the same modulation value. The latter "single pixel" device is often called a global modulator.

A global modulator may be a liquid crystal cell with input and output polarizers, whose transmission (or modulation) is determined by the electric field potential applied across the liquid crystal material. A global modulator may also be an adjustable iris, placed at a pupil position in the projector optical path, whose transmission is determine by the diameter of iris. For lower transmission, the diameter of the iris is reduced; for higher transmission, the diameter of the iris is increased.

For non-stereoscopic viewing, a single pixel liquid-crystal global modulator may be used at a field position, such as next to the display, or at an intermediate image; at a pupil position such as in the projection lens pupil; or between a field and pupil position such as after the exit surface of a projection lens. The modulator's transmission is set based on the IRE levels measured in an image frame, and the image's IRE levels are re-adjusted to allow darker projected black levels, and to account for the lowered throughput in brighter portions of the image. In one case, the IRE levels may be linearly scaled to offset the effect of the modulator transmission on the final image. In another case, the scaling may be non-linear such as a gamma adjust or look-up table, or even piecewise.

Figure 3:
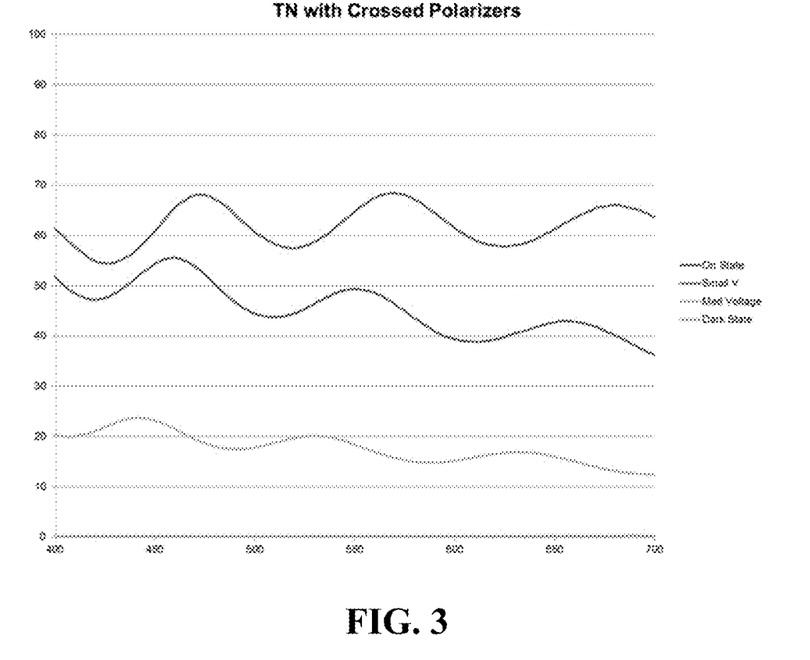
FIG. 3 is a graph illustrating liquid-crystal modulator transmission versus wavelength for various modulation settings.

A global modulator has the benefit of increasing the dynamic range and improving intra-frame contrast at low light levels, but in the case of an LC modulator, can be inefficient for randomly polarized input light. An LC modulator may additionally have a chromatic transmission that varies with modulation and may produce undesirable color non-uniformity as illustrated in FIG. 3. FIG. 3 is a graph illustrating liquid-crystal modulator transmission on the y-axis versus wavelength for various modulation settings on the x-axis. One solution is to condition the image data to account for the chromatic nature of the modulator, for example by providing look-up tables of chromatic correction for various modulator transmission values. Another solution is to achromatize the modulator, thus avoiding the need for chromatic signal conditioning. LC modulators can also have varying transmission and contrast with field of view. An improvement would be to compensate the modulator for varying transmission and contrast versus field of view, for example by using a static C-plate.

Figure 4:
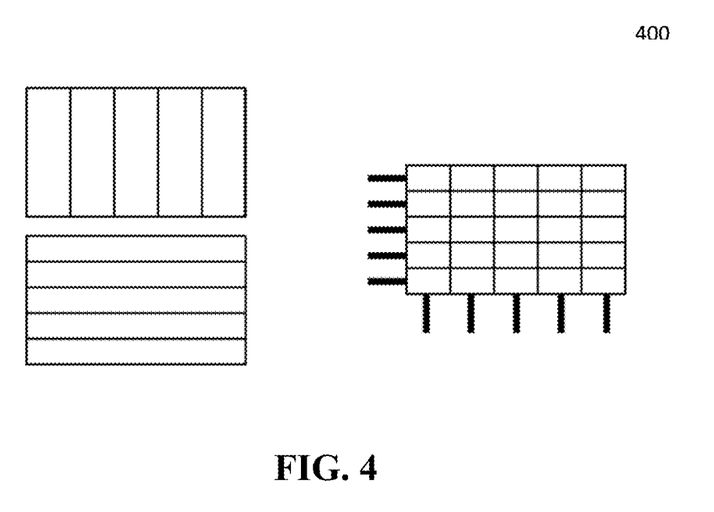
FIG. 4 is a schematic diagram illustrating examples of a passive matrix display utilized as a pixelated modulator.

For non-stereoscopic viewing, a pixelated, or segmented, modulator such as passive or active matrix liquid-crystal panels, as illustrated in FIG. 4, might be combined with an existing high-resolution spatial light modulator, for example a DLP, along an optical path, and placed at a field position, or between a field and pupil position. The pixelated modulator has the benefit of increasing the dynamic range of the projector, and the intra-frame contrast for all light levels. The device, however, can be inefficient for randomly polarized input light. Like the global modulator, the pixelated modulator may be chromatic or with electronic color correction, achromatic, and/or field of view compensated.

In one embodiment a passive matrix addressed modulator 400, as depicted in FIG. 4, may be driven with a multi-line addressing scheme such as described in U.S. Pat. No. 5,420,604, which is herein incorporated by reference.

Near the exit surface of a projection lens, collimated light bundles emerge from the projection lens exit pupil to form individual pixels on a distant screen. When the pixelated modulator is placed at, or close to, the exit surface of the projection lens, these collimated light bundles can overlap such that each section on the modulator can map to more than one pixel. In a similar manner to the backlit LCD of Seetzen, the appropriate transmission for each modulator pixel can be determined by convolving the image data with the lens pupil to produce an image map as depicted in FIG. 5.

Figure 5:
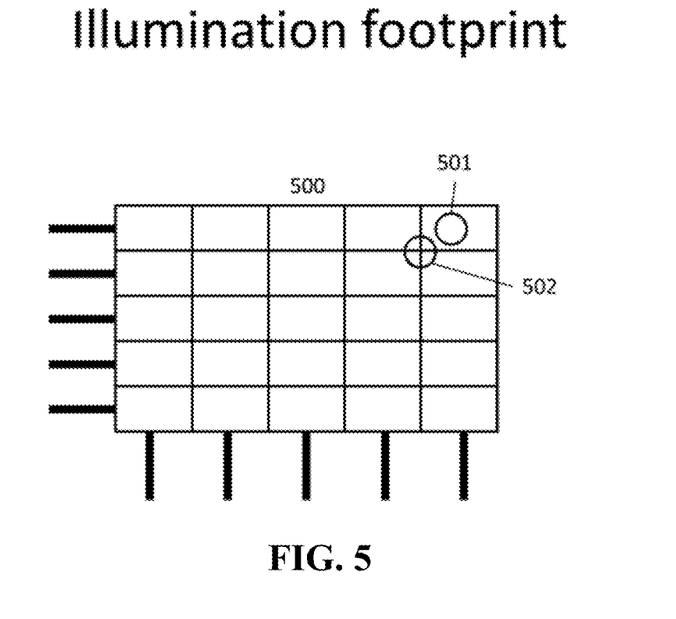
FIG. 5 is a schematic diagram illustrating an example of lens pupil illumination footprint on pixelated modulator surface, in accordance with the present disclosure.

FIG. 5 is a schematic diagram illustrating an example of a lens pupil illumination footprint on a pixelated modulator surface. Although not illustrated in FIG. 5, the pixelated modulator 500 may receive image light or collimated light bundles from the projection lens. As shown in FIG. 5, the pixelated modulator may receive collimated light bundles, such as 501 and 502, from the projection lens. Even though the collimated light bundles are illustrated as circles in FIG. 5, this is for illustrative purposes only and not of limitation. The illumination footprint of the collimated light bundles may be any shape. In one example, the illumination footprint may be the brightest towards the approximate center of the footprint and may appear less bright and taper off towards the edges.

As illustrated in FIG. 5, the illumination footprint of the collimated light bundle 502 can overlap more than one section on the pixelated modulator 500 so that more than one section on the modulator can map to more than one pixel. As previously discussed, the appropriate transmission for each illumination footprint on the modulator section can be determined by convolving the image data with the lens pupil to produce an image map as depicted in FIG. 5.

The image map can then be sub-sampled according to the resolution of the pixelated modulator to produce an array of modulation values appropriate to produce higher dynamic range and intra-frame contrast. The original linear image data may then be divided by the pupil convolution to account for the lower resolution nature of the modulator. In one embodiment, the modulator pixel size is roughly equivalent to the size of projection lens pupil. FIGS. 6A-6D depict this process.

Figure 6A:
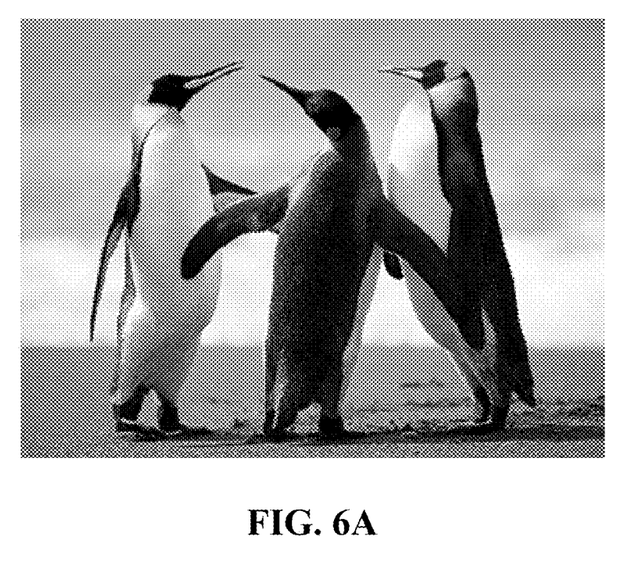
FIG. 6A illustrates a source image, in accordance with the present disclosure.
Figure 6B:
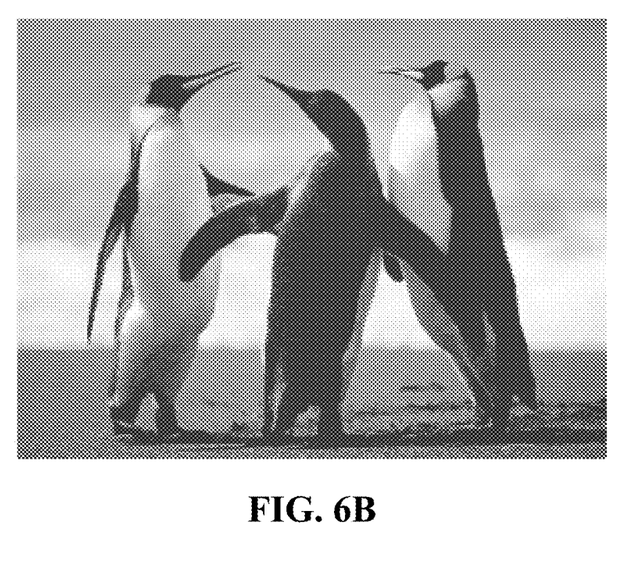
FIG. 6B illustrates a low dynamic range standard projected image, in accordance with the present disclosure.
Figure 6C:
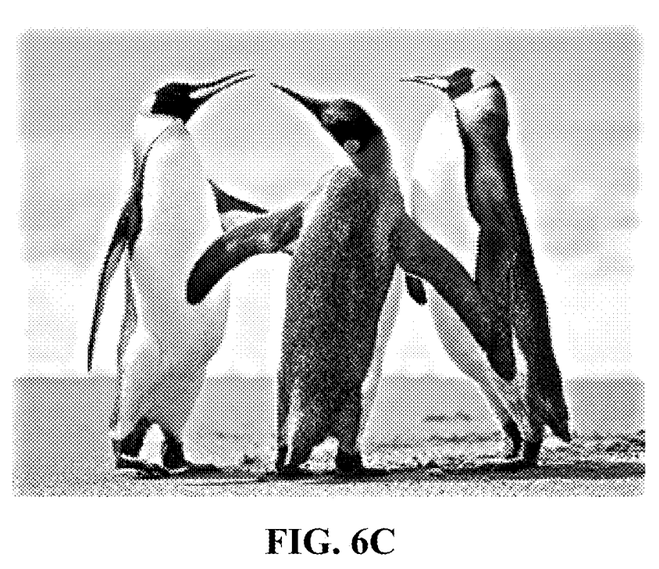
FIG. 6C illustrates a modified IRE image sent to a panel, in accordance with the present disclosure.
Figure 6D:
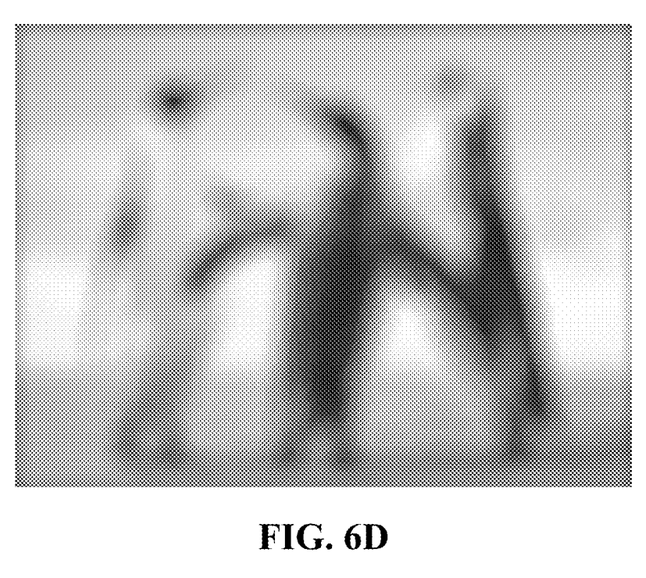
FIG. 6D illustrates a convolution image sent to a modulator, in accordance with the present disclosure.

FIG. 6A illustrates a source image, FIG. 6B illustrates a low dynamic range standard projected image, FIG. 6C illustrates a modified IRE image sent to a panel, and FIG. 6D illustrates a convolution image sent to a modulator. FIG. 6A may be a combination of the information included in FIGS. 6C and 6D.

The pixelated modulator also may also employ adjustment of the location of modulation regions such that they correspond with the intended pixels in the image, particularly when the projected image under- or over-fills the modulator. This correspondence of modulator and image pixels may be adjusted, for example, when a projection lens is zoomed to a different magnification. A camera feedback system as illustrated in FIG. 7, in conjunction with test patterns from the projector, may assist in this adjustment.

Figure 7:
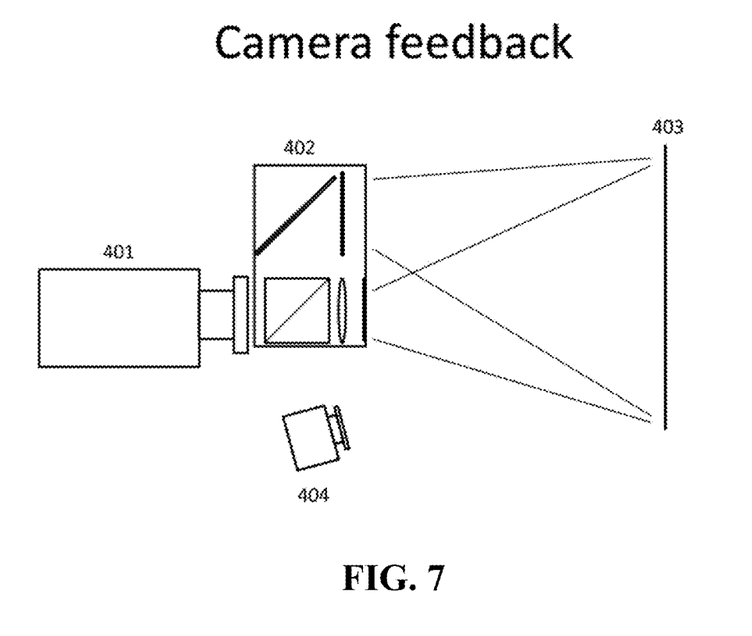
FIG. 7 is a schematic diagram of a camera feedback system, in accordance with the present disclosure.

FIG. 7 is a schematic diagram of a camera feedback system. As illustrated in FIG. 7, a projection system 401 may provide image light to a polarization-preserving stereoscopic system 402. In one embodiment, the polarization-preserving stereoscopic system 402 may be an XL unit, which is discussed in further detail herein. The stereoscopic system 402 then provides light to a screen 403. A camera 404 may gather data and provide the information back to either one or both of the projection system 401 and/or the polarization-preserving stereoscopic system 402. The system receiving the information from the camera 404 may adjust various settings to provide a better image at the screen 403.

Stereoscopic 3D HDR Projection

3D HDR projection may be enabled by combining a lower resolution modulator, such as a global or a pixelated modulator, along the same optical path as a high-resolution spatial light modulator, such as a DLP. If either the global or pixelated/segmented modulator is included in a stereoscopic polarization switch, such as a ZScreen from RealD, as described for example, in commonly owned U.S. Pat. No. 4,792,850 which is herein incorporated by reference in its entirety, then the modulator may be located after the switch's input polarizer, thus negating the large transmission losses due to the presence of the modulator in randomly polarized light. Note the stereoscopic polarization switch may still reduce the transmission of randomly polarized light to less than half its original value; however the addition of a modulator does not significantly reduce light throughput beyond the effect of the switch's polarizer. Again, the global or pixelated modulator may be chromatic or with electronic color correction, achromatic, and/or field of view compensated. The pixelated modulator again employs provisions for convolving and sampling the image data, determining the modulation values, adjusting image IRE values, and establishing correspondence between the image and modulator pixels. In one embodiment, the modulator pixel size is roughly equivalent to the size of projection lens pupil.

Polarization-Preserving 3D HDR Projection

3D HDR projection may be enabled by combining a lower resolution (global or pixelated) modulator along the same optical path (or paths) as a high-resolution spatial light modulator (e.g. a DLP). The global or pixelated modulator may be included in the two or more paths of a polarization-preserving stereoscopic projection system. Examples of such systems include, but are not limited to, the RealD XL, XLW, XLGS, XLDP, and XLWDP products, as generally discussed, for example, in commonly owned U.S. Pat. No. 7,905,602 ("XL unit"), and U.S. Pat. No. 7,857,455 ("XL unit"), U.S. Pat. No. 8,727,536 all of which are herein incorporated by reference in their entireties. Further, as just described, the global or pixelated modulator may be implemented in a dual projection stereoscopic system.

In one example, a polarization-preserving stereoscopic projection XL unit may be located after the exit surface of the projection lens, and splits the randomly polarized input light into orthogonal polarization states. The product then re-directs and manipulates the light to produce matching polarization states, and overlays the two light paths on-screen for viewing. If two global or pixelated modulators are located after the polarization beam splitter (PBS) in the XL unit, light entering the modulators may be polarized and the system efficiency remains high.

Figure 8:
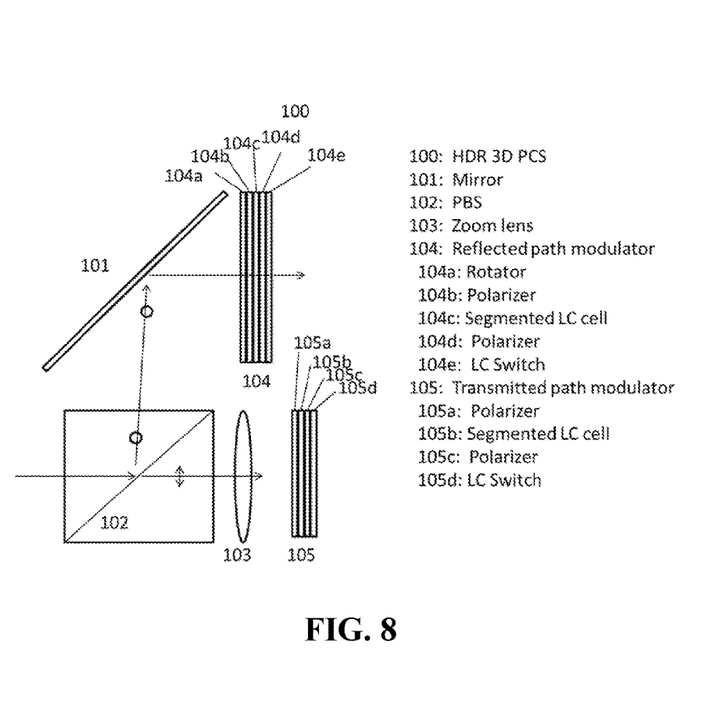
FIG. 8 is a schematic diagram of a polarization-preserving stereoscopic switch with HDR elements, in accordance with the present disclosure.

FIG. 8 is a schematic diagram of a polarization-preserving stereoscopic switch with HDR elements. Additionally, FIG. 8 depicts an active polarization-preserving 3D system with HDR modulators included in the active switch stack. As illustrated in FIG. 8, image light may enter the HDR stereoscopic polarization conversion system 100 at the beam splitting element 102. The image light may then be transmitted along a first path to a lens 103 and reflected to a second path to a reflecting element or mirror 101. The light on the first path may then be received by the transmitted path modulator 105. The transmitted path modulator may include multiple elements including, but not limited, a first polarizer 105a, a first segmented LC cell 105b, a second polarizer 105c, and a first LC switch 105d. Similarly, the light on the second path may be received by a reflected path modulator 104. The reflected path modulator 104 may include multiple elements including, but not limited to, a rotator 104a, a third polarizer 104b, a second segmented LC cell 104c, a fourth polarizer 104d, and a second LC switch 104e. In another embodiment, the modulators may include passive modulators in place of the LC switches. The system of FIG. 8 may receive light from a high resolution spatial light modulator. The modulators located on the first light path and the second light path may be operable to selectively change the transmission of each light path in accordance with changes to the transmission or reflection of light received from the high resolution spatial light modulator. This may achieve a higher dynamic range image than would be achievable without the polarization conversion system in place.

Again, the global or pixelated modulators may be chromatic or with electronic color correction, achromatic, and/or field of view compensated. A combination of global/global, or pixelated/pixelated, or global/pixelated modulators might be used. The global/pixelated modulator implementation may ease the issues with correspondence of image data and modulator pixels. In one embodiment, the modulator pixel size is roughly equivalent to the size of projection lens pupil. In another embodiment only one light path of the XL unit may contain a modulator.

Figure 9:
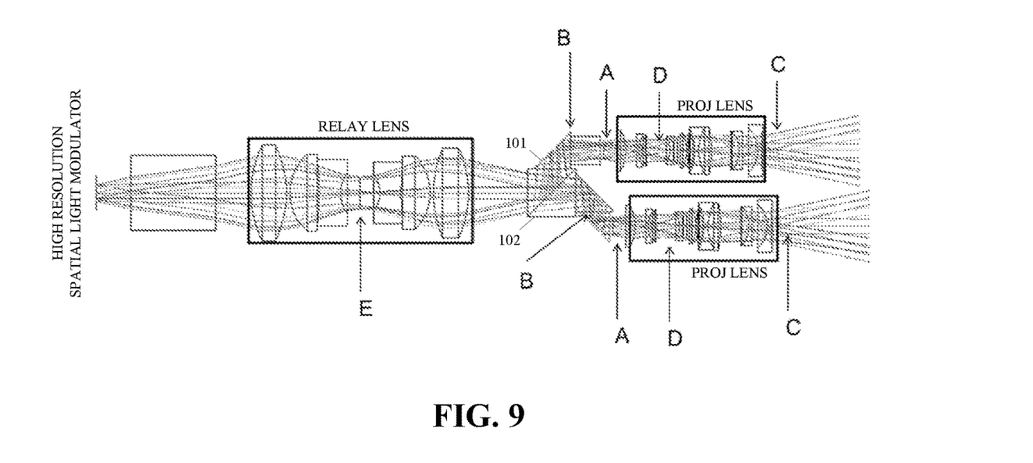
FIG. 9 is a schematic diagram of another polarization-preserving stereoscopic system with HDR elements, in accordance with the present disclosure.

Also described are 3D systems in which the polarization-preserving function may be located in the object conjugate of the projection lens, for example, as generally discussed in commonly owned WO2013010167 and U.S. Patent Application Publication No. 20130182227, both of which are herein incorporated by reference in their entireties. In this case, a relay lens may create a real intermediate image of the display, and a polarizing beam splitter and one or more reflecting surfaces direct orthogonal polarization states to two projection lenses. FIG. 9 depicts such a system.

FIG. 9 is a schematic diagram of another polarization-preserving stereoscopic system with HDR elements. HDR modulators, either global or pixelated, may be included in this system, at one or more of the locations A or field position, B, and/or C, which may be positions between a pupil and field. Global HDR modulators may also be located at locations D and/or E, near the aperture stops of the relay or projection lenses or pupil positions. Again, the global or pixelated modulator may be chromatic, or with electronic color correction, achromatic, and/or field of view compensated. A combination of global/global, or pixelated/pixelated, or global/pixelated modulators might be used. The global/pixelated modulator implementation may ease issues with correspondence of image data and modulator pixels. Additionally, illustrated in FIG. 9, a high resolution spatial light modulator may provide light to a relay lens system which may include a high dynamic range modulator at position E. In one example, the high resolution spatial light modulator may be a 4K digital light processing projection system.

The image impinging on the screen represents the superposition of light from the S and P paths of the XL unit. Assuming an unpolarized input, these images have very nearly the same amplitude. Since the eye averages the chrominance and luminance from each path, some compensation can be done to mitigate the voltage dependent color of the modulator. Assume, for example, that pi-cells are used as the modulator, which are zero-order variable retarders. If one path of the XL unit is given by a liquid crystal variable retarder between parallel polarizers, with the other given by a variable retarder between crossed polarizers, voltage lookup tables can be selected to mitigate chromatic effects. Note that the former has relatively low dynamic range in the half-wave state, but overall dynamic range may be sufficient for most applications.

Figure 10:
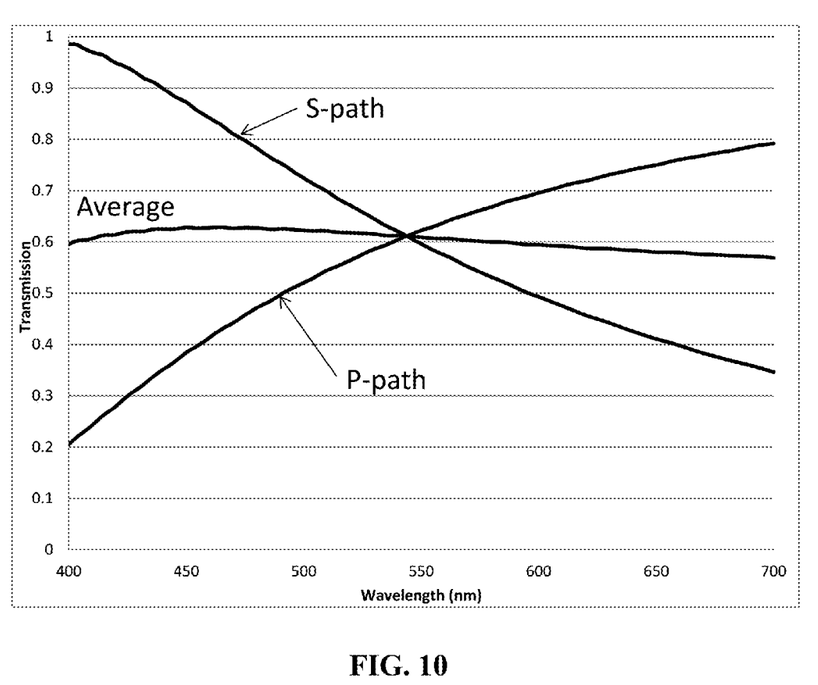
FIG. 10 is a graph illustrating normalized light transmission against wavelength for s-path and p-path light, in accordance with the present disclosure.

FIG. 10 shows the transmission spectra for parallel and crossed polarizer LC variable retarders, along with the composite transmission. Here it is assumed that light may be achromatically split between the two paths, and that the chromatic effect is the result of polarization interference of a zero-order retarder. Voltage pairs are selected such that the addition of the two results in a quasi-achromatic transmission of approximately 60%.

In the absence of achromatic dimming, another form of compensation may be employed. For instance, a particular chromatic luminance value can be selected with the dimming device, which may then, employ a chrominance adjustment in order to maintain consistent color. This could be accomplished with an additional LC device, or within the display engine, though there is an associated overhead.

Note that an additional compensation can be accomplished to mitigate the effects of field-of-view. The retardation value of a pi-cell depends upon incidence angle and azimuth angle. In an XL unit, the polarization switches in each path can be designed such that the color shift due to field of view is largely offset by that in the other path. In addition, field-of-view compensation films can be added which are activated off-normal, such that they offset the shift in LC retardation.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A polarization conversion system, comprising:
a light splitting element operable to receive randomly polarized image light from a projector lens, and operable to direct light with a first polarization state along a first light path and operable to direct light with a second polarization state along a second light path;

a reflecting element located on the second light path and operable to receive reflected light from the light splitting element;

a polarization rotator element located on the second light path and operable to receive reflected light from the reflecting element; and a pixelated modulator located on at least one of the first light path and the second light path and operable to selectively change the transmission of the at least one of the first light path and the second light path, and the pixelated modulator further operable to receive light from a high resolution spatial light modulator, wherein the high resolution spatial light modulator changes the transmission or reflection of light.

2. The polarization conversion system of claim 1, wherein the pixelated modulator is field of view compensated.

3. The polarization conversion system of claim 1, wherein the pixelated modulator comprises a modulator pixel size that is equivalent to the size of projection lens pupil.

4. The polarization conversion system of claim 1, wherein the pixelated modulator is chromatic.

5. The polarization conversion system of claim 1, wherein the pixelated modulator is achromatic.

6. A polarization conversion system, comprising:
a first projection lens;
a second projection lens;
a polarization beam splitter operable to receive image source light and to transmit light of a first polarization state toward the first projection lens on a first light path, and operable to reflect light of a second polarization state toward a second light path;
a relay lens system located before the polarization beam splitter;
a reflecting element located on the second light path operable to reflect light toward the second projection lens; and
a first high dynamic range modulator located within the relay lens system;
wherein the first and second projection lenses are operable to direct the polarization encoded images toward the projection screen.

7. The polarization conversion system of claim 6, further comprising a second high dynamic range modulator located on the second light path, and operable to rotate the polarization of light passing therethrough to provide images of first and second polarization states.

8. The polarization conversion system of claim 6, wherein the first high dynamic range modulator is a global modulator.

9. The polarization conversion system of claim 7, wherein the second high dynamic range modulator is located within the second projection lens.

10. The polarization conversion system of claim 7, wherein the second high dynamic range modulator is located near or at an intermediate image plane.

11. The polarization conversion system of claim 7, wherein the first and the second high dynamic range modulators are achromatic.

12. The polarization conversion system of claim 7, wherein the second high dynamic range modulator is located between the second projection lens and the projection screen.

13. The polarization conversion system of claim 7, wherein the second high dynamic range modulator is pixelated.

14. The polarization conversion system of claim 13, wherein the second pixelated high dynamic range modulator comprises a modulator pixel size that is equivalent to the size of projection lens pupil.

15. The polarization conversion system of claim 7, wherein the second high dynamic range modulator is global.

16. A polarization conversion system, comprising:
a first projection lens;
a second projection lens;
a polarization beam splitter operable to receive image source light and to transmit light of a first polarization state toward the first projection lens on a first light path, and operable to reflect light of a second polarization state toward a second light path;
a reflecting element located on the second light path operable to reflect light toward the second projection lens; and
a first high dynamic range modulator located within at least one of the first projection lens and the second projection lens;
wherein the first and second projection lenses are operable to direct the polarization encoded images toward the projection screen.

17. The polarization conversion system of claim 16, wherein the first high dynamic range modulator is a pixelated modulator.

18. The polarization conversion system of claim 16, wherein the first high dynamic range modulator is a global modulator.

19. The polarization conversion system of claim 16, wherein the first high dynamic range modulator is located within the first projection lens, the system further comprising:
a second high dynamic range modulator located within the second projection lens, and operable to rotate the polarization of light passing therethrough to provide images of first and second polarization states.

* * * * *